United States Patent [19]

Stayton et al.

[11] Patent Number: 5,629,692
[45] Date of Patent: May 13, 1997

[54] METHOD AND APPARATUS FOR ALERTING PILOT TO TRANSPONDER ANTENNA FAILURE IN A TRAFFIC ALERT AND COLLISION AVOIDANCE SYSTEM

[75] Inventors: Gregory T. Stayton, Glendale; Desi D. Stelling; David A. Zinder, both of Phoenix, all of Ariz.

[73] Assignee: Honeywell Inc., Minneapolis, Minn.

[21] Appl. No.: 504,977

[22] Filed: Jul. 20, 1995

[51] Int. Cl.⁶ .................................................. G08G 5/04
[52] U.S. Cl. ...................... 340/961; 340/635; 340/650; 340/652; 340/653; 342/165; 342/173; 342/174; 342/42; 455/115; 455/226.1
[58] Field of Search ...................... 340/945, 961, 340/963, 635, 650, 652, 653; 342/165, 173, 174, 42; 455/115, 226.1; 364/461; 371/68.1

[56] References Cited

U.S. PATENT DOCUMENTS

| | | | |
|---|---|---|---|
| 3,852,734 | 12/1974 | Truax | 340/647 |
| 3,958,244 | 5/1976 | Lee et al. | 455/115 |
| 4,145,692 | 3/1979 | Armstrong et al. | 342/173 |
| 4,506,385 | 3/1985 | Fedde et al. | 485/226.1 |
| 5,262,787 | 11/1993 | Wilson et al. | 342/173 |
| 5,416,489 | 5/1995 | Mailloux | 342/173 |
| 5,469,172 | 11/1995 | Schleder et al. | 342/174 |
| 5,512,900 | 4/1996 | Parkin et al. | 342/174 |

OTHER PUBLICATIONS

TCAS II Pilot's Handbook, issued Apr. 1995 by Honeywell, Inc.

*Primary Examiner*—Jeffery Hofsass
*Assistant Examiner*—Benjamin C. Lee
*Attorney, Agent, or Firm*—Charles J. Ungemach

[57] ABSTRACT

A system for use with aircraft having a collision avoidance system which employs i) two transponder systems each including two antennas and a selected one of two transponders and ii) a failure warning when a transponder system failure occurs, to permit the aircraft to take off when the failure warning is the result of only one antenna failure.

4 Claims, 6 Drawing Sheets

|   | CONDITIONS | | RESULTS | | | | |
|---|---|---|---|---|---|---|---|
| # | XPDR ANT | CONT PAN | XPDR FAIL | DISPLAY | TCAS TEST | XPDR MMEM | XPDR PANEL |
| 1 | [TOP FAIL]<br>BOT FAIL<br>BOTH FAIL | [TA/RA]<br>TA ONLY<br>XPDR<br>STBY | ON<br>[OFF] | [TCAS OFF]<br>TCAS FAIL | PASS<br>FAIL | [TOP ANT FAIL]<br>BOT ANT FAIL | XPDR PASS<br>XPDR FAIL<br>[TOP ANT]<br>BOT ANT |
| 2 | [TOP FAIL]<br>BOT FAIL<br>BOTH FAIL | TA/RA<br>[TA ONLY]<br>XPDR<br>STBY | ON<br>[OFF] | TCAS OFF<br>TCAS FAIL<br>[TA ONLY] | PASS<br>FAIL | [TOP ANT FAIL]<br>BOT ANT FAIL | XPDR PASS<br>XPDR FAIL<br>[TOP ANT]<br>BOT ANT |
| 3 | [TOP FAIL]<br>BOT FAIL<br>BOTH FAIL | TA/RA<br>TA ONLY<br>[XPDR]<br>STBY | ON<br>[OFF] | [- - -]<br>TCAS OFF<br>TCAS FAIL<br>TA ONLY | PASS<br>FAIL | [TOP ANT FAIL]<br>BOT ANT FAIL | XPDR PASS<br>XPDR FAIL<br>[TOP ANT]<br>BOT ANT |
| 4 | [TOP FAIL]<br>BOT FAIL<br>BOTH FAIL | TA/RA<br>TA ONLY<br>XPDR<br>[STBY] | ON<br>[OFF] | [TCAS OFF]<br>TCAS FAIL | PASS<br>FAIL | TOP ANT FAIL<br>[BOT ANT FAIL] | XPDR PASS<br>XPDR FAIL<br>[TOP ANT]<br>BOT ANT |
| 5 | TOP FAIL<br>[BOT FAIL]<br>BOTH FAIL | [TA/RA]<br>TA ONLY<br>XPDR<br>STBY | ON<br>[OFF] | [TCAS OFF]<br>TCAS FAIL | PASS<br>FAIL | TOP ANT FAIL<br>[BOT ANT FAIL] | XPDR PASS<br>XPDR FAIL<br>TOP ANT<br>[BOT ANT] |
| 6 | TOP FAIL<br>[BOT FAIL]<br>BOTH FAIL | TA/RA<br>[TA ONLY]<br>XPDR<br>STBY | ON<br>[OFF] | TCAS OFF<br>TCAS FAIL<br>[TA ONLY] | PASS<br>FAIL | TOP ANT FAIL<br>[BOT ANT FAIL] | XPDR PASS<br>XPDR FAIL<br>TOP ANT<br>[BOT ANT] |
| 7 | TOP FAIL<br>[BOT FAIL]<br>BOTH FAIL | TA/RA<br>TA ONLY<br>XPDR<br>STBY | ON<br>[OFF] | [- - -]<br>TCAS OFF<br>TCAS FAIL<br>TA ONLY | PASS<br>FAIL | TOP ANT FAIL<br>[BOT ANT FAIL] | XPDR PASS<br>XPDR FAIL<br>TOP ANT<br>[BOT ANT] |
| 8 | TOP FAIL<br>[BOT FAIL]<br>BOTH FAIL | TA/RA<br>TA ONLY<br>XPDR<br>[STBY] | ON<br>[OFF] | [TCAS OFF]<br>TCAS FAIL | PASS<br>FAIL | TOP ANT FAIL<br>[BOT ANT FAIL] | XPDR PASS<br>XPDR FAIL<br>TOP ANT<br>[BOT ANT] |
| 9 | TOP FAIL<br>BOT FAIL<br>[BOTH FAIL] | [TA/RA]<br>[TA ONLY]<br>XPDR<br>STBY | [ON]<br>OFF | [TCAS OFF]<br>TCAS FAIL | PASS<br>[FAIL] | [TOP ANT FAIL]<br>[BOT ANT FAIL] | XPDR PASS<br>XPDR FAIL<br>[TOP ANT]<br>[BOT ANT] |
| 10 | TOP FAIL<br>BOT FAIL<br>[BOTH FAIL] | TA/RA<br>TA ONLY<br>XPDR<br>STBY | [ON]<br>OFF | [- - -]<br>TCAS OFF<br>TCAS FAIL<br>TA ONLY | PASS<br>[FAIL] | [TOP ANT FAIL]<br>[BOT ANT FAIL] | XPDR PASS<br>XPDR FAIL<br>[TOP ANT]<br>[BOT ANT] |

Figure 5

METHOD AND APPARATUS FOR ALERTING PILOT TO TRANSPONDER ANTENNA FAILURE IN A TRAFFIC ALERT AND COLLISION AVOIDANCE SYSTEM

BACKGROUND OF INVENTION

1. Field of the Invention

The present invention relates to aircraft alert and collision avoidance systems and more particularly to a method and apparatus to permit the pilot of an aircraft to proceed when one of the antennas of the system fails.

2. Description of the Prior Art

Aircraft traffic alert and collision avoidance systems are well known in the art. A particularly useful system is sold by Honeywell Inc. identified as TCAS II. The TCAS II system employs two transponders and two antennas (an upper antenna and a lower antenna). Either one of the transponders may be switched to the antennas to provide a dual transponder system. The TCAS II system has several modes of operation which are pertinent to the present invention. A first is when a switch on a TCAS II/transponder control panel is turned to a "STBY" (standby) position in which both transponder systems are not activated. A second is when the switch is turned to "XPDR ON" (transponder on) in which case the system has the selected transponder active. A o third is when the switch is in a "TA" (Traffic Alert) position in which case the pilot is alerted whenever any aircraft having Mode-S or Mode-C transponders are about to enter into a first predetermined envelope of airspace (the "caution area"). A fourth is when the switch is in a "TA/RA" (Traffic Alert/Resolution Advisory) position in which case the pilot is alerted whenever aircraft having Mode-S or Mode-C transponders are about to enter into a second predetermined envelope of airspace (the "warning area"). TCAS II can also detect aircraft having Mode-A transponders, but will display them without altitude indication.

Both the upper and lower antennas of the transponder must be operable per FAA requirements to permit the "warning area" display of the KA information to the pilot but only one antenna (either upper or lower) is required for the display of the "caution area" or TA information to the pilot.

Under FAA dispatch requirements and worldwide aircraft rules, aircraft are not permitted to take off without an operating transponder system (a transponder and antenna combination In the prior TCAS II system, if one transponder system failed, the pilot was informed and would switch to the other transponder. If the problem in the first transponder system had been internal, then the second transponder would be good and the failure indication would go away so that the pilot could take off. However, if the problem in the first transponder system had been an antenna failure, the failure warning would not go away when the pilot switched to the second transponder because TCAS II was set up to provide the failure indication if either antenna failed even though the other antenna was good even when in the TA only mode of system operation. Accordingly, the pilot had no alternative but to remain on the ground until the problem was found and repaired.

BRIEF DESCRIPTION OF THE PRESENT INVENTION

The present invention overcomes the problem of the prior art by providing a way for the failure warnings to be removed as long as one transponder and one antenna is still good and the mode of operation is set for TA information where only one antenna is required. More particularly, the transponders of the present invention are programmed to receive information from the control panel and upon the occurrence of a failure involving the first transponder system (the combination of a transponder and antenna), the failure warning will be extinguished when the pilot switches to the second transponder or moves the mode switch on the control panel to the "TA" position so long as at least one of the antennas is still good.

BRIEF DESCRIPTION OF THE DRAWINGS

FIG. 5 shows a logic chart of the various conditions that might exist and the resulting indications produced with the present invention.

DETAILED DESCRIPTION OF THE PREFERRED EMBODIMENT

Figure 1:
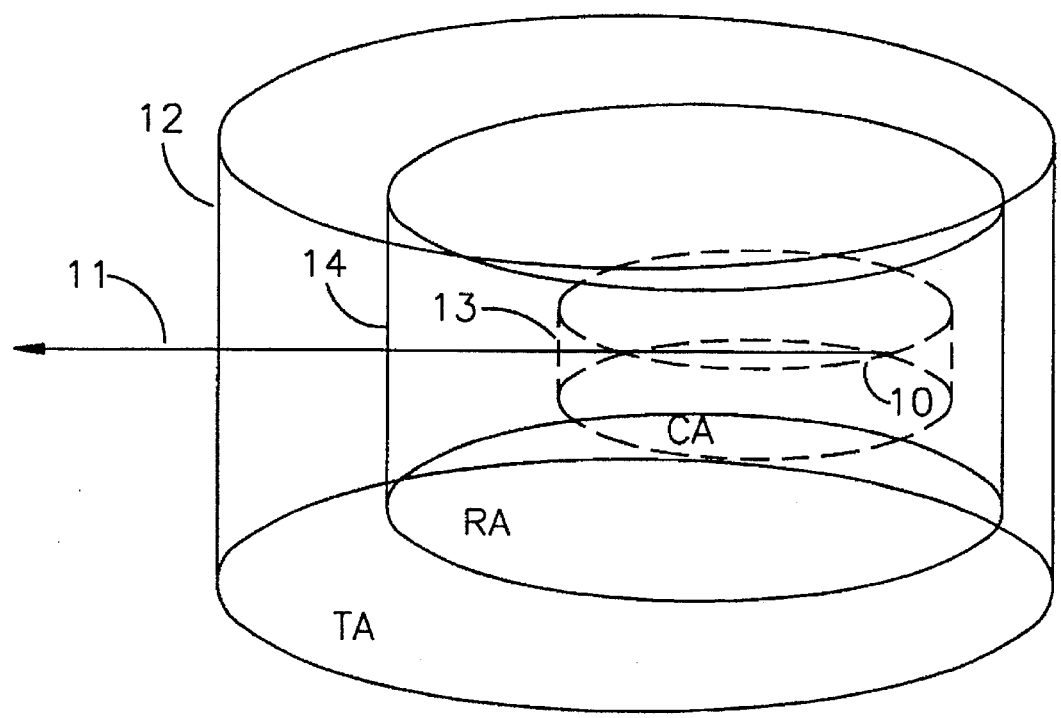
FIG. 1 shows a flight path of an aircraft and the various indication zones around it.

In FIG. 1, an aircraft 10 is depicted moving along a flight path shown by a vector 11. A first large volume of three dimensional airspace or "caution area", surrounding but primarily in front of the aircraft 10, is identified by a generally oblong cylinder 12 identified as the "traffic alert" or TA zone. The TA zone 12 is the zone that begins approximately 20 to 48 seconds (depending on speed) prior to the time another aircraft (intruder) is predicted to enter a second smaller volume of three dimensional airspace around aircraft 10, identified in FIG. 1 by a generally oblong dashed line cylinder 13 and called the "collision area" or CA zone. The TCAS II system provides a warning and indication whenever an intruder is about to enter or is in the TA zone 12 as will be explained below.

In FIG. 1, a third volume of three dimensional airspace or "warning area", larger than the CA zone 13 and smaller than the TA zone 12 is identified by a generally oblong cylinder 14 called the "resolution advisory" or RA zone. The RA zone is the zone that begins approximately 15 to 35 seconds prior to the time an intruder is predicted to enter the CA zone 13. The TCAS II system operates to produce another warning and indication when an intruder is about to enter or is in the RA zone 14 as will also be explained below.

Figure 2:
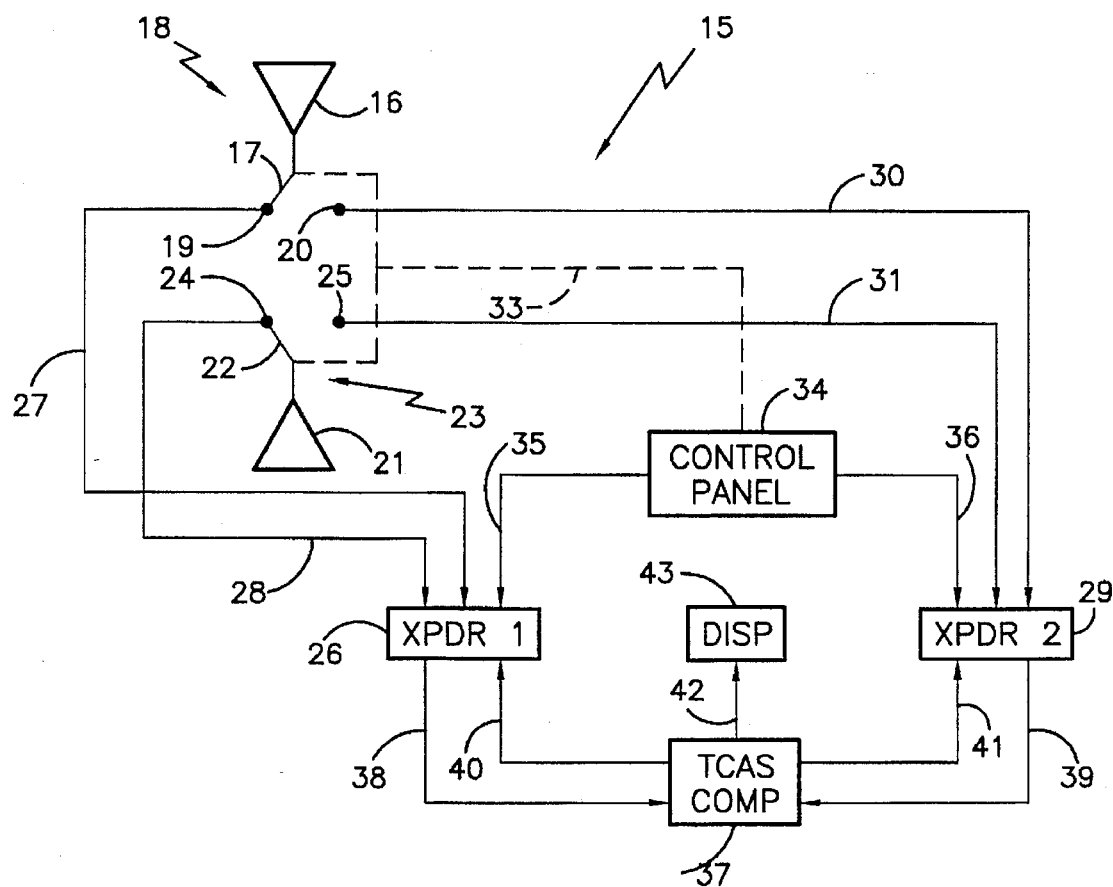
FIG. 2 shows a block diagram of the TCAS II system.

FIG. 2 shows a Block diagram 15 of the TCAS II system to the extent it involves the present invention. An upper antenna 16 is shown connected to the movable arm 17 of a switch 18 having contacts 19 and 20. Similarly, a lower antenna 21 is shown connected to the movable arm 22 of a switch 23 having contacts 24 and 25. In the position shown in FIG. 2, with movable arms 17 and 22 are on contacts 19 and 24 so that the upper antenna 16 and the lower antenna 21 are both connected to a first transponder 26 by conductors 27 and 28 respectively. If switches 18 and 23 were in the other position with movable switch arms 17 and 22 on contacts 20 and 25, then antennas 16 and 21 would be connected to a second transponder 29 as by conductors 30 and 31 respectively. Switch arms 17 and 22 are positioned by a connection shown as dashed line 33 from a control panel 34 whose function will be explained in connection with FIG. 4 below. Control panel 34 is also connected to the first transponder 26 by a connection 35 and to the second transponder 29 by a connection 36. A TCAS computer 37 is connected to receive information from first and second transponders 26 and 29 by connections 38 and 39 respectively and to transmit information to first and second transponders 26 and 29 by connections 40 and 41 respectively. TCAS computer 37 also is shown providing an output 42 to various displays 43 whose function will be explained in connection with FIG. 3 below.

Figure 3:
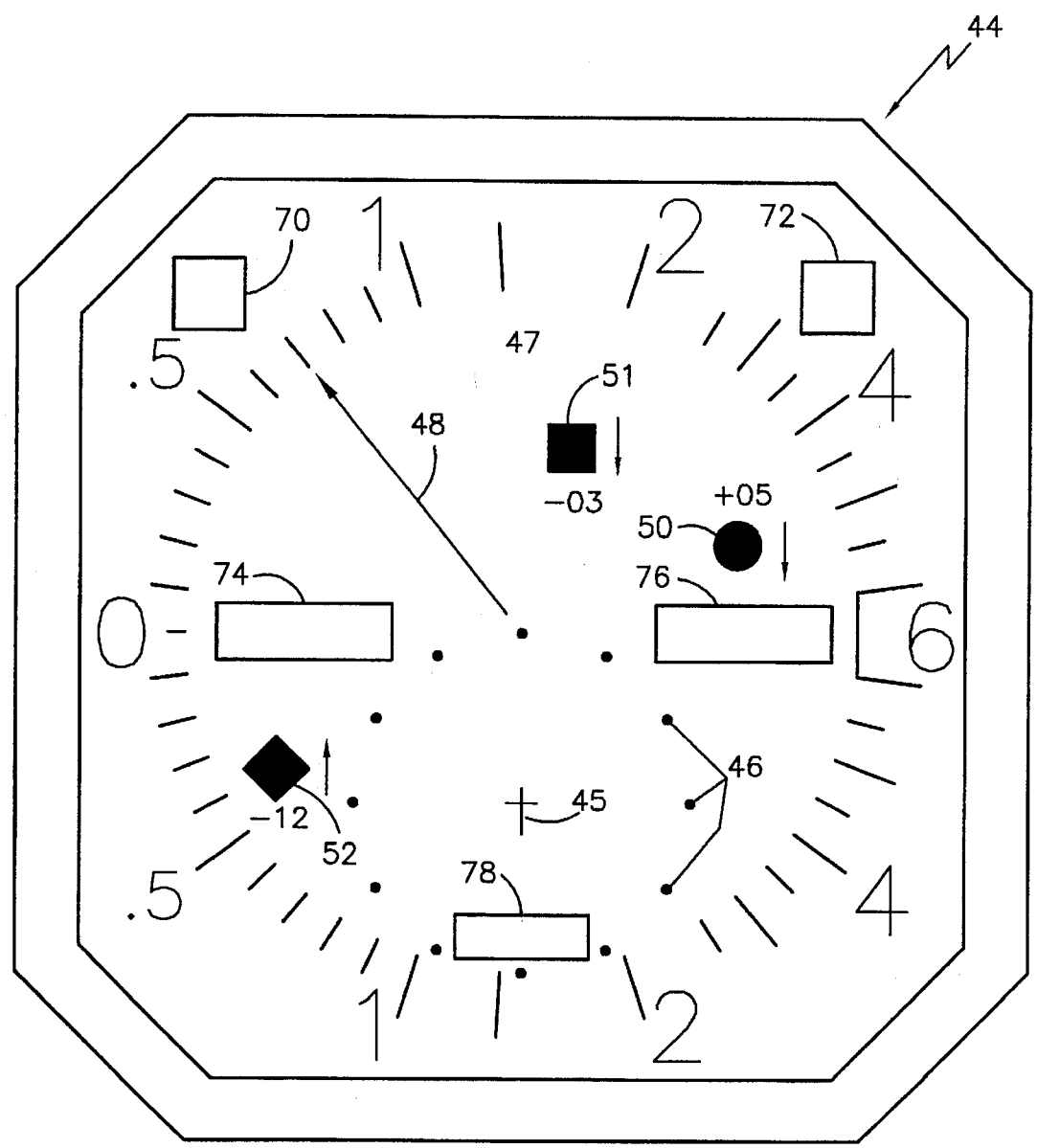
FIG. 3 shows a Traffic Advisory Display of TCAS II.

FIG. 3 shows a Traffic Advisory Display 44 used with TCAS II. Display 44 includes an aircraft symbol 45 to depict the position of the pilot's aircraft and a dotted circle 46 surrounding the aircraft symbol 45 shows a 2 nautical mile range from the aircraft. Generally, semi circular indicia 47 around the periphery of indicator 44 and a pointer 48 together provide an indication of the aircraft rate of change of altitude in hundreds of feet per minute. The portion of the indicia 47 above the inscriptions "0" and "6" shows ascent while below "0" and "6"shows descent.

Other aircraft or "intruders" are identified on display 44 by indicia or "tags" 50, 51 and 52. Tags 50, 51 and 52 are shaped as circles, diamonds or squares and are color coded to provide additional information. A red square represents an intruder entering the warning or RA zone 14 of FIG. 1 and suggests an immediate threat to pilot's aircraft with prompt action being required to avoid the intruder. An amber circle represents an intruder entering the caution or TA zone 12 of FIG. 1 and suggests a moderate threat to the pilot's aircraft and a visual search is recommended to prepare for intruder avoidance. A blue or white diamond represents "proximate traffic" (solid blue indicating somewhat near traffic) and "other traffic" (open blue or white showing more remote traffic) which the equipment has on its track file.

Each indicia or tag is accompanied by a two digit number with a plus or minus sign. For example, "+05" is seen adjacent tag 50, "−03" is seen adjacent tag 51 and "−12" is seen adjacent tag 52). Each tag may also have a vertical arrow pointing up or down. The two digit number represents the relative altitude difference between the pilot's aircraft and the intruder, the plus or minus sign indicates whether the intruder is above or below the pilot's aircraft. The two digit number is also positioned above the intruder symbol for intruder altitude above own aircraft and is positioned below the intruder symbol for intruder altitude below own aircraft and the vertical arrow indicates whether the intruder is climbing or descending in excess of 500 feet per minute.

The display 44 of FIG. 3 also includes several areas represented by rectangular boxes 70, 72, 74 76 and 78 which areas are reserved for one or more word displays to be hereinafter explained.

Figure 4:
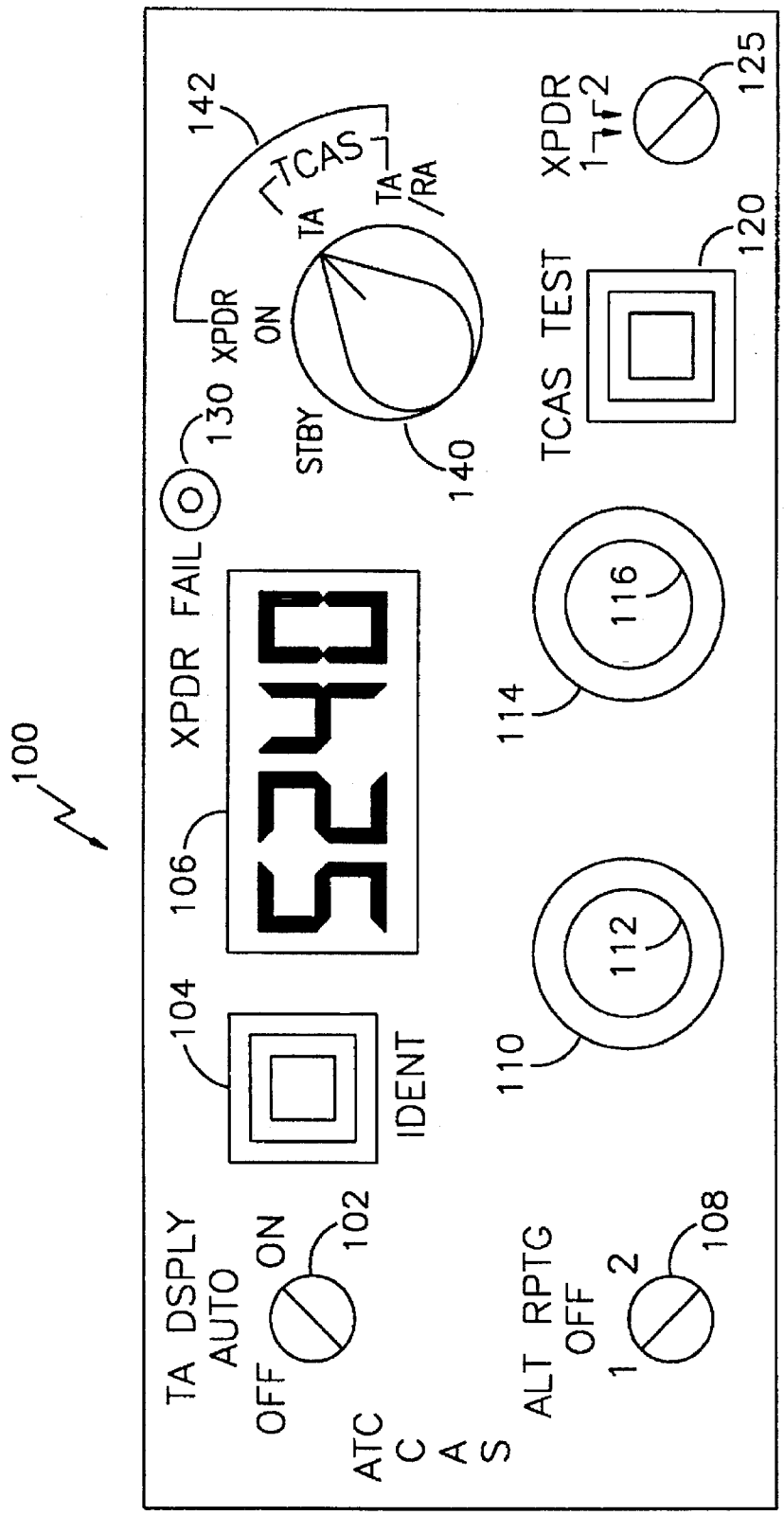
FIG. 4 shows a Control Panel for a Dual Mode transponder of TCAS II.

FIG. 4 shows a control panel 100 for a dual mode TCAS II. Control panel 100 includes a traffic avoidance display switch 102 in the upper left corner which turns the display shown in FIG. 2 to an "off", "auto on", or "on" condition. A push type switch 104 is shown which allows the pilot to specifically identify his aircraft to a receiving ground station when requested. A center display 106 contains the pilot's aircraft identification code and is settable by the pilot utilizing four knobs 110, 112, 114 and 116 below display 106. This code number is automatically broadcast to permit ground receivers or other aircraft to identify the pilot's aircraft on their screens.

In the lower left corner of the panel 100 an altitude reporting switch 108 is shown having three positions, "1", "off" and "2". Positions "1" and "2" are used to select one of two different sources of altitude information to be employed (such as the pilots altimeter or the co-pilot's altimeter) which information is automatically broadcast to other aircraft and ground stations. The "off" position allows the pilot to turn this broadcast off when requested to reduce clutter under crowded conditions or to eliminate erroneous altitude reports when the altitude information supplied is incorrect. To the right of knobs 114 and 116 is a TCAS TEST push switch 120 which, when depressed, will cause the display of FIG. 3 to produce 4 predetermined symbols similar to those shown by reference numerals 50, 51 and 52 in FIG. 3 so that the pilot may determine that the system is properly producing symbology for intruder aircraft. In the lower right corner of panel 100 is a transponder switch 125 having positions "1" and a "2" position which permits the pilot to choose the first transponder 26 or the second transponder 29 to be connected to the antennas 16 and 21 of FIG. 2.

If a transponder system (transponder or antenna) fails, a small light 130 just to the upper right of the display 106 will turn "on" to inform the pilot of the failure. An aural announcement (which may be among the displays 43 of FIG. 2) will also vocally inform him of TCAS system failure at the conclusion of a TCAS test initiated by depressing the "TCAS TEST" switch 120. Upon being advised of a failure, the pilot will then turn switch 125 to connect the other transponder to antennas 16 and 21 of FIG. 2, and if doing so removes the failure, light 130 will extinguish. If not, light 130 will stay on until certain conditions are met as will be explained below.

A switch 140 is seen in the upper right corner of control panel 100 and is shown having four positions, "STBY" "XPDR ON" "TA" and "TA/RA" mentioned above. The selected transponder is "on" in the last three positions ("ON" "TA" and "TA/RA") as shown by the circular marking 142 and the TCAS II is "on" in the last two positions ("TA" and "TA/RA") as shown by the "-TCAS-" marking below the marking 142. In the "STBY" position, the system is in standby, and the transponder is not on.

In FIG. 5, the various conditions and results of the present invention are shown on a chart 160. The left two columns constitute the "conditions" section 162 which show the conditions that may exist and the right five columns constitute the "results" section 164 which show the results that occur under the various conditions. Conditions section 162 is divided into two columns: 1) the XPDR ANT column which shows the antenna fail situation and 2) the CONT PAN column which shows the position of the switch 140 in the control panel 100 of FIG. 4. It is seen that there are 10 separate combinations of conditions in section 162 that may exist to produce the results in section 164 and these ten conditions are shown in rows numbered 1–10 along the left hand side of chart 160. The possible antenna fail conditions in the XPDR ANT column are that the top antenna has failed (TOP FAIL), the bottom antenna has failed (BOT FAIL) or that both antennas have failed (BOTH FAIL). The possible positions for switch 140 of FIG. 4 in the CONT PAN column are TAfRA for both traffic alert and resolution advisory zones, TA ONLY for traffic alert zone only, XPDR ON for the transponders being on but not using TCAS II to monitor either zone and STBY BY for the transponders being off.

The results section 164 is divided into 5 columns: 1) the XPDR FAIL column which shows the condition of the light 130 of FIG. 4, either ON indicating a transponder system failure, or OFF indicating the transponder system is O.K.; 2) the DISPLAY column which indicates certain system conditions A) "normal" indicated by no display, B) TCAS OFF indicating that the control panel switch 140 is in the STBY or the XPDR ON position, C) TCAS FAIL indicating that the TCAS system is not operating properly even though it is "on" and D) TA ONLY indicating that the Switch 140 is in the TA position in FIG. 4. In situation B) and C), the words "TCAS OFF" or "TCAS FAIL" will appear in the area 76 of the indicator of FIG. 3 and in situation D) the words "TA ONLY" will appear in the upper left area 70 of FIG. 3. It is O.K. for the pilot to take off, when the normal situation exists (no display) or, if only one antenna has failed and the transponder fail indication is off and the TA ONLY display in area 70 of FIG. 3 appears. It is not O.K. to take off if the situations B) or C) exist and the words TCAS OFF or TCAS FAIL appear in area 76 of FIG. 3 and the transponder fail indication is on; 3) the TCAS TEST column indicates the condition of the TCAS II system when the pilot presses the TCAS TEST button 120 in FIG. 4. If TCAS II has failed, an audible signal (not shown) will sound "FAIL" alerting the pilot to the fail condition. If the TCAS II is O.K. to use even though a single antenna has failed, the audible signal will sound "PASS"; 4) the XPDR MMEM column is an indication of the condition which is presented to a "maintenance memory" and is not used by the pilot. The maintenance memory stores information for use by the ground crew in correcting any problems; and 5) the XPDR PANEL column which indicates signals which are sent to a panel of lights on the transponders for use by the ground crew and is also not used by the pilot.

Using the chart of FIG. 5 it can be seen how the system of the present invention is going to operate under various conditions. For example, for condition #1, the top antenna has failed and the switch 140 is in the TA/RA position. As mentioned above, the present invention will allow the pilot to take off even if a failure is otherwise indicated provided only one antenna has failed and switch 140 is in the TA ONLY position. In condition #1 although only one antenna has failed, the switch 140 is in the TA/RA position and accordingly the XPDR FAIL light 130 will be ON as indicated in the XPDR FAIL column and a display in area 76 of FIG. 3 will show TCAS OFF (the same as fhiled) as indicated in the DISPLAY column. If the pilot presses the TCAS TEST button of FIG. 3, the audible alarm will say "PASS". The features of condition #1 are stored in the memory for the ground crew as indicated in the XPDR MMEM column and lights on the transponder units indicating that the transponder is O.K. (XPDR PASS) but the top antenna failed (TOP ANT) will inform the maintenance crew as is indicated in the XPDR PANEL column.

On the other hand, if the pilot switches switch 140 of FIG. 4 to the TA position, or to the XPDR ON position then the situation as shown in situation #2 will exist and the XPDR FAIL light will be off as indicated in the XPDR FAIL column and the display will be TA ONLY in area 70 of FIG. 3. Likewise in example #2, when the pilot presses the TCAS TEST button 120 of FIG. 4, the audible alarm will say "PASS" as indicated in the TCAS TEST column of FIG. 5 and the pilot will know it is O.K. to take off. The failure of the top antenna and the condition of the control panel will be stored in memory for use by the ground crew as indicated in the XPDR MMEM and XPDR PANEL columns. It should be noted that as far as the indications are concerned, it makes no difference whether the switch 140 is in the TA position or the XPDR ON position (with TCAS being off) as shown in situation #3 since only one antenna has failed and the transponder with the operable antenna is satisfactory for use in the TA or XPDR ON mode. Again, however, the failure of the top antenna and the condition of the control panel will be stored in memory for use by the ground crew as indicated in the XPDR MMEM and XPDR PANEL columns.

If the transponders are in STBY and not "on" as shown in condition #4, then the XPDR FAIL column will show the light 130 in FIG. 4 is off and the TCAS off condition will be indicated but the results in the other columns are the same as in condition #1 and the pilot will be prevented from taking off.

If the bottom antenna fails, then the situations in condition #5, #6, #7 and #8 will be the same as when the top antenna failed in conditions #1, #2, #3 and #4 above except that the information stored in the memory for the ground crew will show that the bottom antenna failed as shown in the XPDR MMEM and XPDR PANEL columns.

If both antennas fail as in situation #9, then, whether the switch 140 of FIG. 4 is in the TA/RA, TA or XPDR ON positions, the XPDR FAIL light 130 of FIG. 4 will be ON, the indication in area 76 of FIG. 3 will show TCAS OFF and pressing the TCAS TEST button 120 in FIG. 4 will produce an audible "Fail". The ground crew will be informed of both failures in the XPDR MMEM and XPDR PANEL columns.

Finally, if both antennas fail and the switch 140 of FIG. 4 is in STBY as in situation #10, the XPDR FAIL column will show "off" and the DISPLAY column will show normal (no indication) but the audible alarm in the TCAS TEST column will announce "fail" to alert the pilot that something is wrong and the XPDR MMEM and XPDR PANEL columns will be the same as in condition #9. If the pilot attempts to activate the system, the conditions of situation #9 will be present and the appropriate failure indications will be annunciated.

Figure 6:
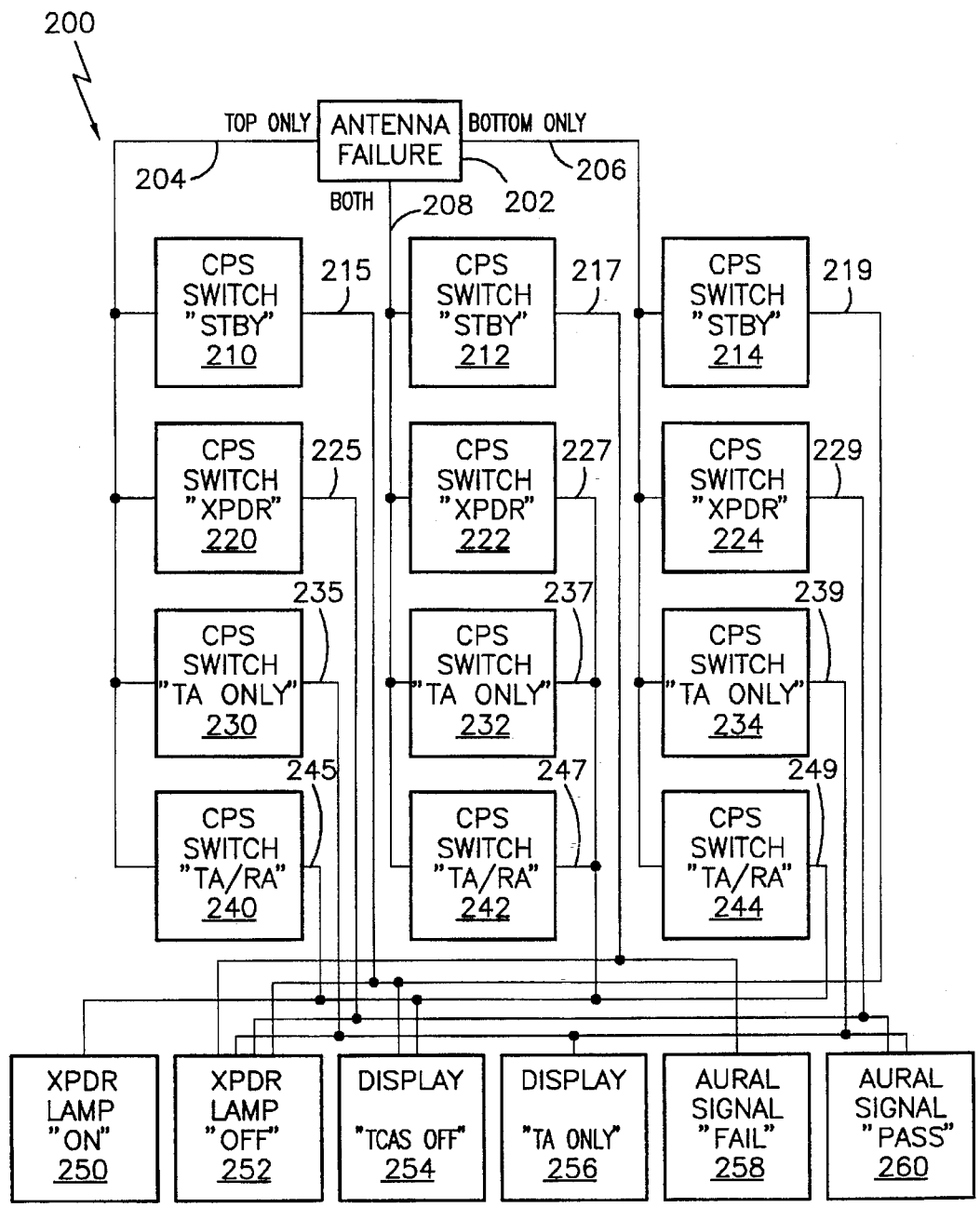
FIG. 6 shows a state diagram or flow chart for the operations of the present invention.

FIG. 6 shows the state diagram or flow chart 200 for the system of the present invention. The top box 202 shows the three antenna failure conditions: the "top only" condition on line 204, a "bottom only" condition on line 206 and a "both" condition on a line 208. Each of the three failure conditions are shown connected to each of the four control panel switch positions. Standby positions are shown in boxes 210, 212 and 214 having outputs 215, 217 and 219 respectively; transponder "on" positions are shown by boxes 220, 222 and 224 having outputs 225, 227 and 229 respectively; TA only positions are shown by boxes 230, 232 and 234 having outputs 235, 237 and 239 respectively; and TA/RA positions are shown by boxes 240, 242 and 244 having outputs 245, 247 and 249 respectively.

The various conditions used by the pilot are shown as transponder lamp "on" and "off" in boxes 250 and 252 respectively; display indications "TCAS OFF" and "TA ONLY" by boxes 254 and 256 respectively; and the audible signals by boxes "TCAS FAIL" and "TCAS PASS" by boxes 258 and 260 respectively. The information that is stored for the maintenance crew have been omitted for simplicity.

With FIG. 6, one can trace out which displays that the pilot uses will be energized for each failure condition and each position of the control panel switch 140 of FIG. 4. These correspond to the chart of FIG. 5.

It is thus seen that I have provided a system which will allow one antenna to fail in a TCAS II system but still allow the pilot to take off so long as he operates in the TA only or XPDR mode only. Accordingly take off will be permitted under FAA and world rules to prevent loss of unnecessary delay with the prior art. Many changes will occur to those skilled in the art and we do not intend to be limited to the specific apparatus or steps used in connection with the description of the preferred embodiments. For example, various indicia and aural sounds have been described to inform the pilot of the conditions. Other indicia and sounds may easily be substituted.

The embodiments of the invention in which an exclusive property or right is claimed are defined as follows:

1. In an aircraft warning system that uses first and second transponder systems with each transponder system including first and second antennas and a selected one of first and second transponders either of which are connected to the first and second antennas by a transponder switch, the warning system further including a selector switch when in a first position is operable to provide a first warning when intruder aircraft are about to enter a first zone which is within no less than a first time period in advance of possible collision and a second warning when intruder aircraft are about to enter a closer zone which is within no less than a second time period in advance of a possible collision, and the selector switch in a second position is operable to provide the first warning only, the warning system also including a failure warning when there is a transponder system failure using the first transponder, the method of extinguishing the failure warning whenever the failure warning is due to only a single antenna failure comprising the steps of:

A. upon receiving the failure warning, selecting the second transponder and if the failure warning is not then extinguished, B positioning the selector switch in the second position, in which case the failure warning will thereby be extinguished if only a single antenna failed.

2. The method of claim 1 wherein the warning system transponder switch is operable in a first position to connect the first transponder to the two antennas and in a second position to connect the second transponder to the two antennas and wherein step A includes selecting the second transponder by positioning the transponder switch in the second position.

3. The method of claim 1 wherein the selector switch has a third position in which the transponders may operate without the first and second warnings and wherein step B includes positioning the selector switch in the second or third position to extinguish the failure warning if only a single antenna failed.

4. The method of claim 2 wherein the warning system transponder switch is operable in a first position to connect the first transponder to the two antennas and in a second position to connect the second transponder to the two antennas and wherein step A includes selecting the second transponder by positioning the transponder switch in the second position.

* * * * *